United States Patent [19]

McMaster

[11] 3,933,764
[45] Jan. 20, 1976

[54] COAGULATIVE RECOVERY OF POLYSULFONE RESINS FROM SOLUTIONS THEREOF

[75] Inventor: Lee P. McMaster, Long Valley, N.J.

[73] Assignee: Union Carbide Corporation, New York, N.Y.

[22] Filed: July 25, 1974

[21] Appl. No.: 491,845

[52] U.S. Cl. .............. 260/79.3 M; 260/49; 260/79
[51] Int. Cl.² ........................................ C08G 75/20
[58] Field of Search .................. 260/49, 79.3 M, 79

[56] References Cited
UNITED STATES PATENTS
3,532,677  10/1970  Baron ............................. 260/79.3
3,795,660  3/1974  Feasey et al. ..................... 260/49

*Primary Examiner*—Melvyn I. Marquis
*Attorney, Agent, or Firm*—Bernard Francis Crowe

[57] ABSTRACT

Polysulfone resins dissolved in organic solvents can be recovered from these solutions by dispersion into water followed by treatment of the dispersion with an aliphatic hydrocarbon.

15 Claims, 1 Drawing Figure

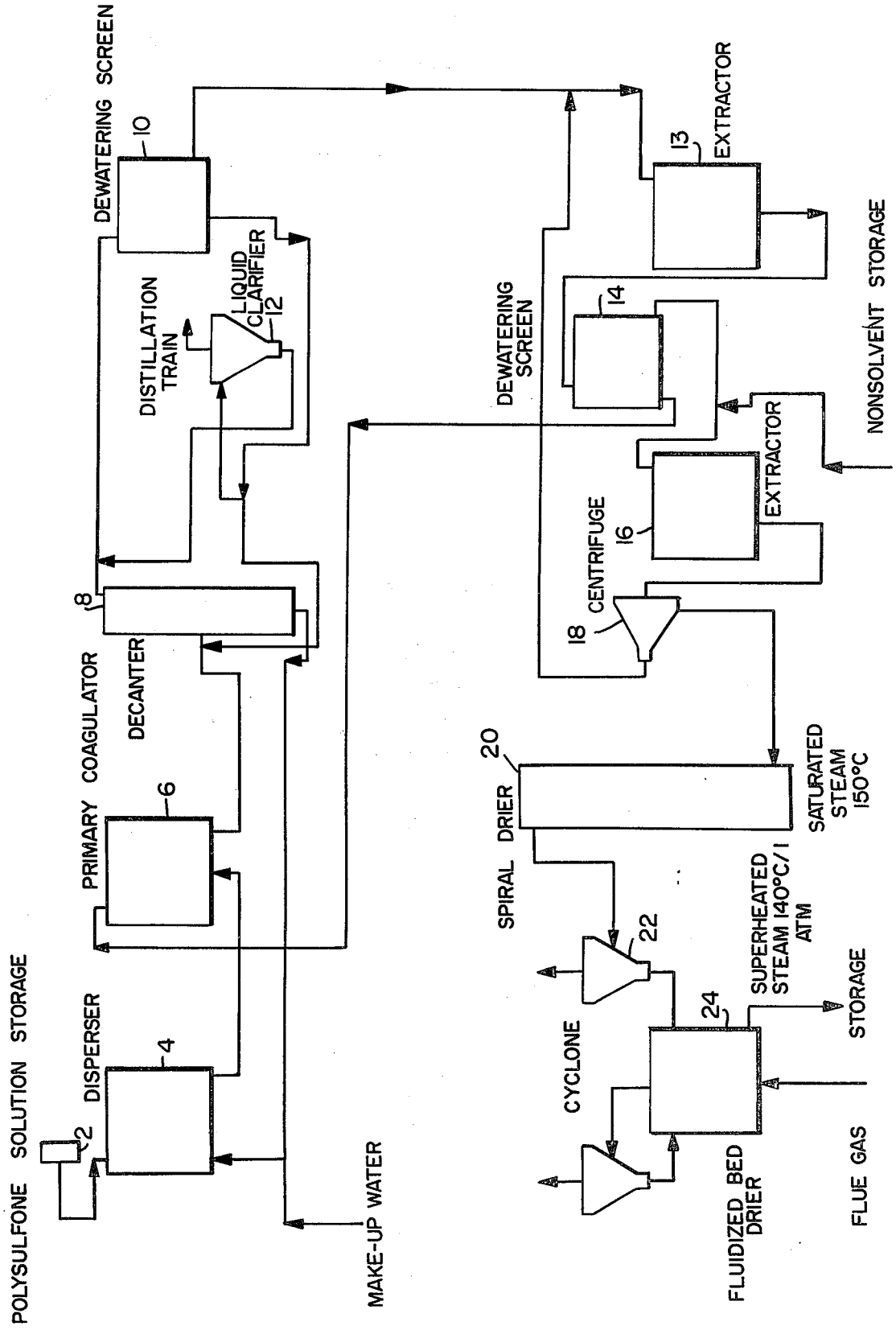

COAGULATIVE RECOVERY OF POLYSULFONE RESINS FROM SOLUTIONS THEREOF

BACKGROUND OF THE INVENTION

This invention pertains to the coagulative recovery of polysulfone resins from solutions thereof and more particularly to the use of aliphatic hydrocarbon non-solvent to effect coagulation.

One of the modes of preparing high polymers is by the solution polymerization of the corresponding monomer or monomers. It is known that the recovery of normally solid organic polymers from solution can be accomplished by non-solvent coagulation, i.e., by treating the solution with an excess of a liquid which is a non-solvent for the polymer but which is miscible with the polymer solvent. Agitation is usually required to facilitate mixing and to encourage the formation of normally solid polymer particles which can be isolated from the liquid phase without complications such as the formation of emulsions.

Other methods that have been used for the recovery of normally solid polymers from solution include precipitation induced by cooling the solution or by concentration of the solution by partial evaporation of the solvent. Removal of the solvent can also be induced by stripping at reduced pressures and/or elevated temperatures, melt recovery and spray precipitation.

The use of mechanical devolatizers to dry off residual solvents from recovered polymers leads to some thermal and shear degradation of the polymers and is often plagued by mechanical failures, seal strains and the like. Unfortunately, polymers, such as, normally solid polyarylene polyether polysulfone thermoplastic resins which are among the most difficult to rid of residual solvents, are also among the worst offenders in causing failure of mechanical processing equipment.

All of the above-described techniques have serious drawbacks. Precipitation and stripping are both expensive and time consuming and are usually limited to laboratory scale operations whenever possible. Melt recovery is complicated by mechanical failure of the equipment, and by degradation of the polymer.

The use of mixed solvents is complicated by the difficulty of solvent removal from the polymer particles during drying of the precipitated resin. It is well known in the art that polymers in general, regardless of their chemical make-up, retain solvent to varying degrees when isolated by prior art methods due to various causes, as for example, adsorption and mechanical or physical entrapment. Entrapment of solvents occurs with polymer structures ranging from the highly porous to the non-porous.

The effects of solvent retention by polymers are notorious and are reflected not only in deficient physical and mechanical properties but also in fabrication difficulties and in longer range manifestations such as polymer degradation or instability which is particularly serious in articles fabricated from the polymers. Regardless of the method used, it is often desirable to limit the amount of residual solvent retained in the recovered polymer to less than about 0.1%. In the case of polyarylene polyether polysulfone thermoplastic resins, it is preferred that the recovered resin contain less than about 500 parts per million (ppm) of residual solvent or any other liquid.

As the glass transition temperature of the polymer increases, the ease of recovery from solution by devolatilization methods decreases. The polyarylene polyether polysulfone thermoplastic polymers are particularly susceptible to this problem.

Another factor which complicates any system of polymer recovery from solution is the porosity and pore structure of the solid polymer particles. It is essential that the solvent/non-solvent mixture left within the precipitated resin maintain access to the external solution via the pore structure and that the pore walls do not collapse while removing the binary solution of solvent and non-solvent, as, for instance, by a drying operation; otherwise, entrapment of residual liquids ensues.

It is therefore an object of this invention to provide a suitable method for recovering normally solid, polyarylene polyether polysulfone thermoplastic resins from their solutions.

It is another object to recover normally solid polyarylene polyether polysulfone thermoplastic resins at temperatures as close to ambient temperatures as possible.

It is yet another object of this invention to recover normally solid polyarylene polyether polysulfone thermoplastic resins without entraping the binary solution of solvent and non-solvent either during precipitation or by collapse of the pore walls during drying.

It is still another object of this invention to recover dry, normally solid polyarylene polyether polysulfone thermoplastic resins containing less than 500 ppm of residual liquids.

SUMMARY OF THE INVENTION

A satisfactory method meeting the above-described objects has been found for a coagulative recovery of normally solid polyarylene polyether polysulfone thermoplastic resin from a solution thereof which comprises:

A. dispersing a solution of about 5–40% by weight solids content of normally solid polyarylene polyether polysulfone thermoplastic resin dissolved in an organic solvent having a solubility parameter, $\delta$, of about 7 to about 11 with a fractional polarity of about 0.04 to 0.4 into a continuous carrier liquid phase as discrete droplets having a Sauter mean diameter of approximately 50–250 microns;

B. Contacting the dispersion of (A) with a nonpolar aliphatic hydrocarbon having five to about 10 carbon atoms and a solubility parameter, $\delta$, of about 7 to about 8 in a turbulent shear field so that each discrete droplet of resin solution coalesces with and is surrounded by said aliphatic hydrocarbon;

C. Continuing agitation of the contacted dispersion until sufficient organic solvent has diffused out of the resin droplets and sufficient aliphatic hydrocarbon has diffused into the resin droplets whereby normally solid, porous, non-agglomerated polyarylene polyether polysulfone thermoplastic resin particles are obtained;

D. Isolating from the continuous carrier liquid phase, normally solid resin particles containing a mixture of organic solvent and aliphatic hydrocarbon;

E. Removing organic solvent and aliphatic hydrocarbon not trapped within the pores of the normally solid resin particles, from said resin particles;

F. Extracting residual organic solvent from the normally solid resin particles with an aliphatic hydrocarbon having five to 10 carbon atoms and a solubility parameter, $\delta$, of about 7 to about 8; and G. Reducing the level of liquids in the extracted normally solid resin particles to less than 500 ppm.

The theory of solubility parameters and fractional polarities and a listing of values for various solvents can be found in the article of the J. Paint Technology, 43-57, January, 1966.

The fraction polarity, p, is equal to the fraction of total interactions which are due to dipole-dipole attractions, $p + i + d = 1$ where $d$ = fraction of interactions due to dispersion effects;

where $i$ = fraction of interactions due to induction effects.

The solubility parameter is a measure of the strength of the interactions in a material but does not contain information concerning the nature of these interactions. For characterizing materials from this standpoint it can be assumed that intermolecular interations are due solely to dispersion induction and dipole forces.

"Sauter mean diameter" is explained fully in "Atomization and Spray Drying" by W. R. Marshall, Jr. of the Chemical Engineering Progress Monograph Series, No. 2, Vol 50, pages 50–53, published by the American Institute of Chemical Engineers, NYC (1954).

Suitable aliphatic hydrocarbons falling within the scope of this invention include n-pentane, 2-methyl pentane, 3-methyl pentane, n-hexane, 2-methyl hexane, 3-methyl hexane, 2,2-dimethyl pentane, 2,3-dimethyl pentane, 2,4-dimethyl pentane, 3,3-dimethyl pentane, 3-ethyl pentane, 2,2,3-trimethyl butane, n-heptane, n-octane, 2,2,4-trimethyl pentane, n-nonane, n-decane, and commercially available mixtures of the foregoing and other related isomers.

The preferred aliphatic hydrocarbons include in particular n-hexane, hexane isomers, n-heptane, and heptane isomers, as well as $C_9$–$C_{10}$ aliphatic mixture having a boiling range of about 157° to 163°C. sold as Soltrol 100 by Phillips Petroleum Corporation.

Preferred organic solvents include halogenated aromatic hydrocarbons such as chlorobenzene, o-dichlorobenzene, 1-chloronaphthalene, o-chlorophenol, and p-bromoanisole. Other organic solvents which can be used include aliphatic hydrocarbons, such as, 1,1,2,2-tetrachloroethane, 1,1,2-trichloroethane, chloroform, ω,107′-dichloroethyl ether, 1,4-dichlorobutane, 1,4-dichloro-2-butene, 1,4-dichloro-2-butyne, 1,2-dichloroethane, cis-dichloroethylene, methylene chloride and epichlorohydrin, as well as p-cresol, methyl salicylate, anisole, diphenyl ether, diphenoxy methane, acetophenone, benzophenone, benzaldehyde, aniline, nitrobenzene, thiophene, and p-methoxyphenyl-2-ethanol.

The minimum weight ratio of aliphatic hydrocarbon nonsolvent to polymer solution is dictated by that amount of nonsolvent just sufficient to form discrete nonagglomerated polyarylene polyether polysulfone resin particles.

The polyarylene polyether polysulfone thermoplastic resins of this invention contain repeating units having the formula

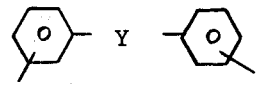

wherein Ar is a divalent aromatic radical containing at least one unit having the structure

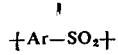

in which Y is oxygen, sulfur or the radical residuum of an aromatic diol, such as a 4,4′-bis(p-hydroxyphenyl) alkane. Exemplary polysulfones include those which have the following repeating units:

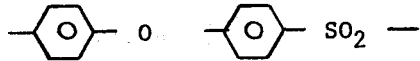

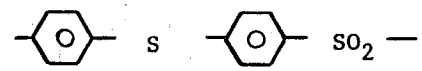

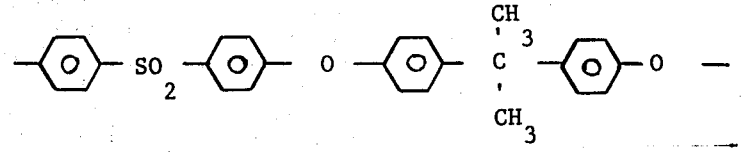

copolymerized units of

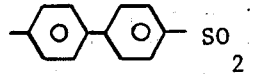 — and 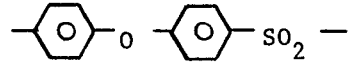

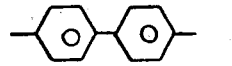 Q 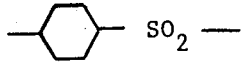

wherein Q is oxygen or sulfur, as well as any combination of these repeating units.

The degree of polymerization of these polysulfones is sufficiently high so as to afford normally solid thermoplastic resins.

These polysulfone resins can be prepared by a substantially equimolar one-step reaction of a double alkali metal salt of a dihydric phenol with a dihalobenzenenoid compound in the presence of specific liquid organic sulfoxide or sulfone solvents under substantially anhydrous conditions using a azeotroping solvent such as chlorobenzene.

The solids content of polymer solution to be coagulated has a critical upper limit of about 30–40 weight percent. If the solids content is higher than this level then one does not obtain an interconnecting pore structure within the structure of the particle and furthermore, one cannot achieve particle size resin in the 50–250 $\mu$ range. Resin particles above 250 $\mu$ again do not afford the pore structure desired. The lower limit for the polymer solution solids content is not narrowly critical, but to be practical, one would not economically employ polymer solutions of less than about 10 weight percent.

The dispersion of the polymer solution in a continuous water phase can be accomplished by any high shear dispersing device known in the art, such as, an Oakes Mixer, a Netco Mixer, Premier Dispersator and the like.

The term high shear field is defined herein to mean the generation of large velocity gradients in the fluid phase by the movement of solid objects such as propellers or turbine blades at high speeds.

DESCRIPTION OF THE INVENTION

The instant invention is a low temperature polymer recovery technique which utilizes in part the virtual insolubility of the polymer in a suitable non-solvent. The non-solvent is an extracting agent which extracts the solvent from the dispersed polymer solution phase, leaving the polymer behind in the form of discrete particles. When the dispersed polymer solution droplets are contacted with non-solvent, coagulation of the polymer takes place within the droplets forming porous particles whose size is dictated by the size of the original polymer solution droplet. Although most of the organic solvent is thus removed from the polymer particle, some does remain within the pores of each particle which must be removed. This is done by first removing the particles saturated with the mixture of solvent and non-solvent from the continuous liquid phase and then removing the external layer of organic solvent and aliphatic hydrocarbon surrounding the particles. This can be effected by wet screening or any simple drying technique at ambient temperatures. Since there is still organic solvent trapped within the pores of the polymer particles it is necessary to extract the particles with fresh aliphatic hydrocarbon which simulates a countercurrent operation of an extraction train. This operation can be carried out several times until the particles are free of trapped solvent. The aliphatic hydrocarbon together with extracted residual organic solvent can then be easily removed by any conventual drying technique. One preferable method is to contact the polymer particles directly with boiling water at 100°C. Another preferable method consists of contacting the polymer particles with super heated steam in an oven, or a continuous dryer. These techniques then leave dry polymer particles free of both the original organic solvent and the added aliphatic hydrocarbons.

The choice of both organic solvents and aliphatic hydrocarbons is limited by several considerations. First of all, it has been found that the relative extraction efficiency of the aliphatic hydrocarbons for the organic solvents decreases as the molecular weight of the aliphatic hydrocarbon increases. Those aliphatic hydrocarbons containing about 10 carbon atoms have been determined as the approximate upper limit. Since an increase in molecular weight in the aliphatic hydrocarbons decreases its volatility this also constitutes another variable determining the upper limit of the aliphatic hydrocarbon. At the lower limit, the aliphatic hydrocarbon must not be too volatile, otherwise, it would be too transient to function as described above for the extraction of the organic solvent. Another factor to be considered in the choice of a particular aliphatic hydrocarbon is the fact that as the molecular weight of the aliphatic hydrocarbon increases, larger concentrations of organic solvents within the polymer particle can be tolerated during the final drying operation without loss of polymer pore structure and severe particle agglomeration. Consequently fewer secondary extraction stages are necessary for the higher molecular weight aliphatic hydrocarbons before the final drying operation to complete removal of the organic solvent. Additionally as the volatility of the aliphatic hydrocarbon decreases, it is easier to condense and thus decreases the necessary heat transfer area of equipment designed for the recovery of the aliphatic hydrocarbon following its removal from the polymer particles. These operating and economic considerations have led to the conclusion that the much preferred aliphatic hydrocarbon is n-hexane or hexane isomers with n-heptane or heptane isomers as a second choice.

The first step in the recovery of polysulfone resin from solution involves the creation of an unstabilized dispersion of polysulfone resin solution in a carrier liquid used as the dispersing medium. Water is the most economical and available choice as the carrier liquid although the invention is not limited to water. The unstabilized dispersion is contacted in a second stage, maintained in a highly turbulent state in the presence of a third liquid which is a non-solvent for the polysulfone resin. This non-solvent may or may not be miscible with the carrier liquid. This contacting of the non-solvent and droplets of the polysulfone dispersion causes the polysulfone resin to be precipitated from solution in the form of discrete particles of uniform shape and size controlled by the size and shape of the original droplets created by the high shear device used for creating the unstabilized dispersion in the first stage. Conventional coagulation, carried out by contacting of the resin solution with non-solvent directly, that is, without prior dispersion in a carrier liquid, is often unsatisfactory because it is difficult to control the size and shape of the coagulated particles. It has been found that it is uneconomical to remove residual solvents from particles which are too large. In this respect, particles which have a large internal surface area can be dried with significantly greater ease than particles having little or no internal surface area. Forming uniformly shaped particles is significant with respect to the hydraulic and pneumatic transport and ease of drying in the process steps necessary to remove residual solvents from the resin particles. Furthermore, non-uniform particle shape often has a deleterious effect on the bulk density of coagulated resin. Other disadvantages of conventional coagulation are concerned with processing limitations which arise with respect to allowable resin concentrations in solution. Because it is often necessary to dilute the polymer solutions so that the viscosity falls in a range where conventional coagulation can be carried out, significantly larger quantities of non-solvent are required which is uneconomical with respect to the overall resin recovery process.

In the practice of this invention, many of the process limitations discussed above are avoided. A dispersion of the polysulfone resin solution in the dispersing medium is prepared without the aid of an emulsifying or stabilizing agent but by violent agitation or shearing of the polymer solution in any of several conventional types of dispersing devices including mills, homogenizers, high shear dispersing mixers, ultrasonic emulsators and the like. The choice of dispersing device is not critical but is dictated by the volume of resin solution to be dispersed, the droplet size of the resin solution, the droplet size distribution desired, temperature and concentration of the resin solution. The ultimate size of the normally solid resin particle obtained by this process is controlled by the droplet size of the resin solution created in the dispersing device. The volume fraction of the resin solution in the dispersing medium can be varied over a significant range, oftentimes up to volume fractions approaching the point of phase inversion. The concentration which is preferred is one which provides an economic compromise between the increased equipment size required for low disperse phase volume fractions and increased power costs and loss of drop size uniformity found with strongly coalescing systems of high disperse phase volume fractions. Generally, dispersed volume fractions between 0.05 and 0.30 are optimal.

In the second step of this process the unstabilized dispersion is fed into a second mixing vessel in turbulent agitation where the polymer solution droplets are contacted with sufficient non-solvent to cause precipitation of the resin from solution. The level of non-solvent required is dictated by the thermodynamics of the polymer/solvent/non-solvent dispersing medium system and by the necessary restriction that the solvent concentration be reduced within the polymer particles to a level sufficient to bring the particle through the sticky stage quickly enough to avoid substantial agglomeration of the particles with one another and with the surfaces of the agitation equipment.

While a range of ratios of organic solvent to aliphatic hydrocarbon of about 1.25:1 to 0.25:1 can be used, it is preferred to use a range of about 1:1 to 0.4:1. The polymer particles can be separated from the external liquids in the system by any known mechanical separation process such as filtration, centrifugation or screening. The liquids retained in the pores and dissolved in the resin particles must also be removed. Although the remaining extraction steps necessary for the removal of these internal liquids are conventional in nature, the economic success of the remaining stages hinges on the character, that is, size, shape and internal structure of the resin particles prepared in the coagulation step. After mechanical separation of the resin particles from the external liquid, the resin may be washed with more non-solvent in either a batch or continuous fashion to reduce further the solvent level within the resin.

The non-solvent can be removed from the pores of the resin particle by any of several drying techniques including oven drying, extractive distillation with steam or vacuum oven drying. The advantages of extractive distillation with steam result from the fact that the non-solvent/water vapor can be condensed overhead and hence recovered. If steam extraction is used, any of several conventional drying techniques can be employed to remove the water from the resin including oven drying, fluid bed drying and spray drying.

It will be understood by those skilled in the art that no unusual or specifically designed equipment is necessary since the invention resides in the nature and sequence of the steps as outlined above and not on the means for carrying them out.

The invention is illustrated on a commercial scale in the schematic flow sheet outlined in the FIGURE for the recovery of polysulfone from a chlorobenzene solution. A polysulfone/chlorobenzene solution is pumped from storage 2 into a high shear dispersing device 4 containing water where the polymer solution is dispersed into droplets with a Sauter mean diameter in the range of 50–250 microns. The polymer solids content of the original solution and each dispersed droplet is about 15–25 percent by weight. The dispersion is then pumped from disperser 4 to a coagulator 6 also equipped with an agitator; the dispersion enters the coagulator 6 near the agitator where it is mixed in the high shear zone with a stream of n-hexane which enters from the top of coagulator 6, the amount of n-hexane being regulated to effect a weight ratio in coagulator 6 of approximately 1:1 chlorobenzene to n-hexane. The mixture from coagulator 6 is then passed to decanter 8 where a slurry containing solid polysulfone and the mixture of chlorobenzene and n-hexane is separated by decantation from the water. The water is recirculated from this point back to disperser 4. The polymer slurry is led to a dewatering screen 10 where the mixture of chlorobenzene and n-hexane is separated from porous coagulated polysulfone. The mixture of chlorobenzene and n-hexane is pumped into a nozzle discharge centrifuge type liquid clarifier 12 where polysulfone fines are removed. The mixture of chlorobenzene and n-hexane is fed to another system where the two components are separated by distillation for re-use. The polysulfone particles isolated at the dewatering screen 10 still contain considerable quantities of solvent both within the pores of the polymer and dissolved in the resin phase. The polysulfone particles are therefore led into an extractor 13 containing n-hexane and an agitator. Polysulfone is recovered from the extracting liquid by passing to the dewatering screen 14 and then extracted again in a second agitated extractor 16 also containing n-hexane. The mixture of n-hexane and polysulfone particles are then passed to a solid bowl centrifuge 18 where the solid polysulfone particles are recovered. The n-hexane is recycled through the extractor 13. The polysulfone particles are led to an indirect heat transfer dryer, such as, a Werner-Pfleiderer spiral dryer 20 where the particles are contacted with super heated steam at approximately 1 atmosphere at 140°C. The polysulfone particles are then led from the spiral dryer 20 to a cyclone separator 22. The final drying stage of the polysulfone particles is then effected in a fluidized bed drier 24 where the volatiles content of the final dried polysulfone is decreased to a maximum of 500 parts of chlorobenzene and n-heptane per million parts of polysulfone. The polysulfone particles can then be removed from drier 24 for storage.

Temperature and pressure are not critical during the dispersing and the contacting steps of the claimed method where ambient conditions are preferred for economic reasons. During the drying stages, temperatures normally used with the equipment employed are satisfactory.

The invention is further described in the Examples which follow. All parts and percentages are by weight unless otherwise specified.

EXAMPLE 1

COAGULATIVE RECOVERY OF POLYSULFONE FROM A CHLOROBENZENE SOLUTION

The normally solid polyarylene polyether polysulfone thermoplastic resin used in this Example is composed of repeating units having the structure shown below:

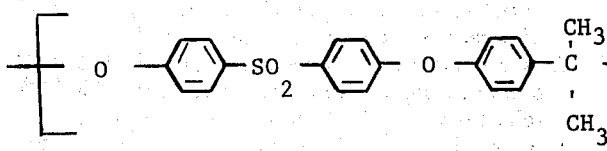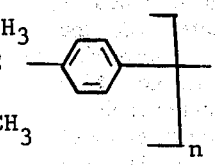

where $n = 10$ to 500.

This resin can be prepared in the following manner.

A 1-liter stainless steel resin kettle, fitted with an inert gas sparge tube, thermocouple, mechanical stirrer, dropping funnel, and take-off to a six-plate (glass helix) fractionating column connected to a moisture trap and condenser, was charged 51.36 g. (0.225 mole) of bisphenol A, 2,2-bis(4-hydroxyphenyl)propane, 115 g. of dimethyl sulfoxide, and 330 g. of chlorobenzene. The mixture was heated to 60°–80°C., whereupon a clear solution was obtained. Air was displaced from the system by flushing with nitrogen or argon and 35.86 g. of a 50.2% solution of aqueous sodium hydroxide (0.450 mole) was added with stirring over a period of about 10 minutes. Two liquid phases then appear: one predominantly chlorobenzene, the other disodium salt of bisphenol A dissolved in aqueous dimethyl sulfoxide. The system was brought to reflux with inert gas sparging through the reaction mixture. Water was removed from the system as an azeotrope with chlorobenzene, the latter being returned to the system continuously. In so doing the temperature of the reaction mixture rose from about 120°C. initially to about 140°C. at the conclusion of this step. When this temperature was reached, most of the water originally present had distilled and the disodium salt of bisphenol A appeared as a precipitate.

Excess azeotrope solvent was distilled from the system until the temperature of the flask contents reached 155°–160°C. At this point the salt precipitate redissolved with the formation of a very viscous solution. Only traces of water remained at this stage.

A 50% solution of 64.61 g. (0.225 mole) of 4,4'-dichlorodiphenyl sulfone in dry chlorobenzene maintained at a temperature of 110°C. was added over a period of about 10 minutes to the reaction flask, the excess solvent being allowed to distill at a rate sufficient to hold the temperature of the flask contents at about 160°C. When all of the sulfone had been added, polymerization was continued until the desired degree of polymerization was reached. A reduced viscosity as measured in chloroform solution (0.2 g./100 ml). at 25°C. of about 1.0 or higher was reached in about 1 hour at 160°C. after addition of all of the sulfone.

The temperature of the reaction mixture was not allowed to drop below about 150°C. until the polymerization reaction was well along, as sodium-terminated low polymer is very difficult to redissolve upon heating owing to the problem of solvent migration. Too high a temperature during addition of the sulfone and subsequent polymerization were avoided, since the polymerization is mildly exothermic and, extremely rapid above 160°C. to prevent excessive solvent decomposition, discoloration and/or gelation.

Upon addition of the sulfone, the reaction mixture became vividly colored, ranging from orange to yellow to deep green.

Polymerization was terminated by passing methyl chloride into the polymerizing mixture at a temperature of about 120°–160°C. over a period of 5 minutes.

The color of the reaction mixture faded to a light amber, signalling the completion of the termination.

The viscous polymer solution was then cooled and diluted with a sufficient amount of chlorobenzene to afford a 20% by weight solution of polysulfone. The by-product sodium chloride was removed by filtration and the dimethyl sulfoxide was removed by aqueous extraction.

Polysulfone solution prepared as described above was treated as follows. Twenty pounds per hour of this 20% solution was introduced into a disperser similar to that in the FIGURE having a void of 0.4 cubic feet together with 146 pounds per hour of water. The disperser was operated to afford polymer solution droplets having a Sauter mean size of approximately 200 microns and was operated at a disperse phase hold up to 12%. The dispersed phase polysulfone solution droplets were coagulated in the coagulator using n-hexane at a 1:1 ratio of chlorobenzene to n-hexane. The coagulated resin and associated organic liquids contained in each droplet were decanted from the water phase. The resin was wet screened to remove the external organic liquids from the polysulfone coagulated particles. The polysulfone was then contacted 2 times with fresh n-hexane at a 2.1:1 ratio of n-hexane to wet polysulfone. This simulated counter current operation of an extraction train. Following the last extraction step, the polysulfone resin was split into two fractions. One fraction was dried by contacting the resin directly with boiling water at 100°C. The second fraction was dried by contacting the resin with superheated steam at 130°–140°C. in an oven. In the second case, much of the heat needed to vaporize the organic volatiles, viz., chlorobenzene and n-hexane was supplied by indirect heating from the walls of the oven. Samples were removed and analyzed for the volatiles content as a function of time using a gas phase chromatography technique. The results of the analysis are presented below.

| | SATURATED STEAM | | SUPERHEATED STEAM | |
|---|---|---|---|---|
| Time (min.) | % Hexane | % monochlorobenzene | % Hexane | % monochlorobenzene |
| 0 | 48.6 | 4.90 | 48.6 | 4.90 |
| 30 | — | — | 2.81 | 2.09 |
| 60 | 2.65 | 2.09 | .012 | .077 |

These results indicate a clear superiority of super heated steam scrubbing for removing the volatile components from the polysulfone particles.

CONTROL A

The superiority of the dispersed phase technique used in this invention was demonstrated by comparing this operation with a direct contacting of the polysulfone solution with n-hexane without the benefit of an aqueous carrier phase and predispersion step. Of the advantages afforded by this invention the first was a demonstration that a more uniformly sized and shaped polysulfone particle size distribution was obtained. A comparison of polysulfone resins coagulated under the direct mode showed under a three power magnifying glass that the particles were in the form of flakes which are more difficult to dry and more difficult to handle. In contrast the particles obtained as per the procedure of Example 1 showed uniformly shaped particles of a much finer size than in the case of direct contacting.

Secondly, the dispersion in water technique allows the polymer particle forming capability of the coagulator to be uncoupled from its solvent extraction objective. At low shear rates of dispersed mode operation, more uniformly shaped particles were formed. This obviates the need for very high speed and more difficult to maintain particle forming devices.

Thirdly, the use of the continuous water phase as in Example 1, prevents the build-up of coagulated resins on the walls and baffles of the coagulator at low non-solvent to polymer solution ratios. Solvent/non-solvent recycle back to the coagulator becomes necessary in the direct mode operation, (no water dispersion) unless higher non-solvent/polymer solution ratios are used.

EXAMPLE 2

The procedure of Example 1 was used with polysulfone polymer prepared as a 15% solution in chlorobenzene and using Soltrol 100 (a tradename of Phillips Petroleum Corporation for a mixture of $C_9$–$C_{10}$ aliphatic hydrocarbons having a boiling range of 157°–163°C.) as the coagulating non-solvent. The ratio of chlorobenzene to nonsolvent was 0.47:1 and the volume percent of polymer solution in the water phase was 6.4%. Using a continuous operation, polysulfone resin particles having a Sauter mean diameter of 100–200 $\mu$ microns were readily obtained.

Although the invention has been described in its preferred form as of a certain degree of particularity, it is understood that the present disclosure of the preferred forms has been made only by way of example and that numerous changes may be resorted to without departing from the spirit and the scope of the invention.

What is claimed is:

1. Method for the coagulative recovery of normally solid polyarylene polyether polysulfone thermoplastic resin from a solution thereof which comprises:
   A. Dispersing a solution of about 5–40% by weight solids content of normally solid polyarylene polyether polysulfone thermoplastic resin dissolved in an organic solvent having a solubility parameter, δ, of about 7 to about 11 with a fractional polarity of about 0.04 to 0.4 in a continuous carrier liquid phase as discrete droplets having a Sauter mean diameter of about 50 to about 250 microns.
   B. Contacting the dispersion of (A) with an aliphatic hydrocarbon having five to about 10 carbon atoms and a solubility parameter, δ, of about 7 to about 8 in a turbulent shear field so that each discrete droplet of resin solution coalesces with and is surrounded by said aliphatic hydrocarbon;
   C. Continuing agitation of the contacted dispersion until sufficient organic solvent has diffused out of the resin droplets and sufficient aliphatic hydrocarbon has diffused into the resin droplets whereby normally solid, porous, non-agglomerated polyarylene polyether polysulfone thermoplastic particles are obtained;
   D. Isolating from the continuous carrier liquid phase normally solid resin particles containing a mixture of organic solvent and aliphatic hydrocarbon;
   E. Removing organic solvent and aliphatic hydrocarbon not trapped within the pores of the normally solid resin particles from said resin particles;
   F. Extracting residual organic solvent from the normally solid resin particles with an aliphatic hydrocarbon having five to 10 carbon atoms and a solubility parameter, δ, of about 7 to about 8; and
   G. Reducing the level of liquids in the extracted normally solid resin particles to less than 500 ppm.

2. Method claimed in claim 1 wherein the polyarylene polyether sulfone thermoplastic resin contains repeating units having the formula
   Ar—SO$_2$
   wherein Ar is a divalent aromatic radical containing at least one unit having the structure

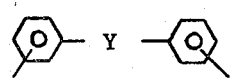

in which Y is oxygen, sulfur or the radical residuum of an aromatic diol.

3. Method claimed in claim 1 wherein Y is oxygen.
4. Method claimed in claim 1 wherein Y is sulfur.
5. Method claimed in claim 2 wherein Y is the radical residuum of an aromatic diol.
6. Method claimed in claim 5 wherein the aromatic diol is a bis-p-hydroxyphenyl)alkane.
7. Method claimed in claim 5 wherein the aromatic diol is a 2,2'-bis(p-hydroxyphenyl) propane.
8. Method claimed in claim 1 wherein the polyarylene polyether polysulfone has repeating units of the structure:

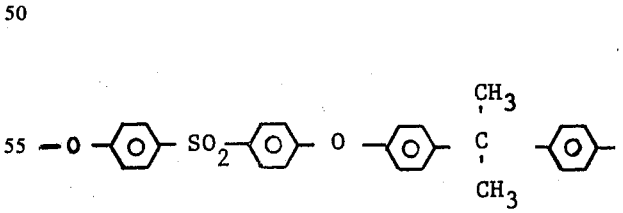

9. Method claimed in claim 1 wherein the organic solvent is chlorobenzene.
10. Method claimed in claim 1 wherein the aliphatic hydrocarbon is n-hexane.
11. Method claimed in claim 1 wherein the aliphatic hydrocarbon is a mixture of hexane isomers.

12. Method claimed in claim 1 wherein the aliphatic hydrocarbon is n-heptane.

13. Method claimed in claim 1 wherein the aliphatic hydrocarbon is a mixture of heptane isomers.

14. Method claimed in claim 1 wherein the weight ratio of organic solvent to aliphatic hydrocarbon is in the range of 1.25:1 to 0.25:1.

15. Method claimed in claim 1 wherein the volume fraction of the resin solution in the dispersing medium is between 0.05 and 0.30.

* * * * *

UNITED STATES PATENT OFFICE
CERTIFICATE OF CORRECTION

Patent No. 3,933,764          Dated Jan. 20, 1976

Inventor(s) Lee P. McMaster

It is certified that error appears in the above-identified patent and that said Letters Patent are hereby corrected as shown below:

Col. 4, line 2, "$\omega,107'$-dichloroethyl ether" should read -- $\omega,\omega'$-dichloroethyl ether.

Col. 12, line 28 the formula $Ar-SO_2$ should read

-- $-[Ar-SO_2]-$ --.

Col. 12, line 43, "bis-p-hydroxyphenyl) alkane should read --bis(p-hydroxyphenyl)alkane.

Signed and Sealed this

Twenty-first Day of September 1976

[SEAL]

*Attest:*

RUTH C. MASON
*Attesting Officer*

C. MARSHALL DANN
*Commissioner of Patents and Trademarks*